United States Patent
Hong

(10) Patent No.: US 12,466,430 B2
(45) Date of Patent: Nov. 11, 2025

(54) APPARATUS AND METHOD FOR CONTROLLING AUTONOMOUS DRIVING VEHICLE

(71) Applicants: Hyundai Motor Company, Seoul (KR); Kia Corporation, Seoul (KR)

(72) Inventor: Jeong Ki Hong, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 296 days.

(21) Appl. No.: 18/215,995

(22) Filed: Jun. 29, 2023

(65) Prior Publication Data

US 2024/0199067 A1    Jun. 20, 2024

(51) Int. Cl.
*B60W 60/00* (2020.01)
*B60W 30/095* (2012.01)

(52) U.S. Cl.
CPC ...... *B60W 60/001* (2020.02); *B60W 30/0956* (2013.01); *B60W 2540/10* (2013.01); *B60W 2540/12* (2013.01); *B60W 2554/4042* (2020.02); *B60W 2556/65* (2020.02); *B60W 2720/106* (2013.01)

(58) Field of Classification Search
CPC ......... B60W 2540/10; B60W 2540/12; B60W 2554/4042; B60W 2556/65; B60W 2720/106; B60W 30/0956; B60W 60/001
See application file for complete search history.

(56) References Cited

U.S. PATENT DOCUMENTS

| | | | | |
|---|---|---|---|---|
| 6,044,321 A * | 3/2000 | Nakamura | ........... | B60K 31/047 701/96 |
| 6,972,709 B1 * | 12/2005 | Deem | ....................... | G01S 7/35 342/205 |
| 9,744,969 B2 * | 8/2017 | Kim | ................. | B60W 30/18163 |
| 11,328,608 B2 * | 5/2022 | Bergquist | .............. | B60W 10/18 |
| 11,904,889 B1 * | 2/2024 | Lumb | ................. | B60W 30/143 |
| 2009/0228185 A1 * | 9/2009 | Laiou | .................... | B60W 30/16 701/96 |
| 2012/0065863 A1 * | 3/2012 | Takagi | .................. | B60W 30/16 701/96 |
| 2015/0291163 A1 * | 10/2015 | Kim | ..................... | B60W 30/16 701/96 |

(Continued)

FOREIGN PATENT DOCUMENTS

WO    WO-2023201953 A1 * 10/2023 ............ B60W 30/16

*Primary Examiner* — Babar Sarwar

(74) *Attorney, Agent, or Firm* — Banner & Witcoff, Ltd.

(57) ABSTRACT

The present disclosure relates to an autonomous driving control apparatus and a control method thereof. An autonomous driving control apparatus may include a sensor device, a communication device, one or more processors, and memory. The sensor device may detect a leading vehicle of a host vehicle. The communication device may receive, from the leading vehicle, vehicle information of the leading vehicle. The autonomous driving control apparatus may, based on a deceleration request of the host vehicle, operate in an excessive deceleration limit mode; determine, based on the vehicle information of the leading vehicle, a speed control signal for changing a vehicle speed of the leading vehicle; and adjust, based on the speed control signal and while operating in the excessive deceleration limit mode, an excessive deceleration limit level of the host vehicle.

20 Claims, 13 Drawing Sheets

(56) References Cited

U.S. PATENT DOCUMENTS

| | | | |
|---|---|---|---|
| 2018/0079409 A1* | 3/2018 | Nath | G08G 1/167 |
| 2019/0001976 A1* | 1/2019 | Liu | B60W 50/085 |
| 2019/0001977 A1* | 1/2019 | Lin | B60W 30/143 |
| 2019/0143971 A1* | 5/2019 | Makled | B60W 30/18163 |
| | | | 701/96 |
| 2021/0094542 A1* | 4/2021 | Horiguchi | B60T 7/042 |
| 2021/0155234 A1* | 5/2021 | Kohler | B60W 30/14 |
| 2021/0155235 A1* | 5/2021 | Yang | B60W 50/14 |
| 2021/0179143 A1* | 6/2021 | Shin | B60W 30/0956 |
| 2022/0081006 A1* | 3/2022 | Kang | B60W 60/00 |
| 2022/0118972 A1* | 4/2022 | Kim | B60W 30/0956 |
| 2022/0281451 A1* | 9/2022 | Bani Milhim | B60W 30/16 |
| 2023/0124314 A1* | 4/2023 | Foster | B60W 60/0011 |
| | | | 701/26 |
| 2023/0182735 A1* | 6/2023 | Andermård | G01S 17/86 |
| | | | 701/96 |
| 2024/0083430 A1* | 3/2024 | Crowder | B60W 30/16 |

* cited by examiner

APPARATUS AND METHOD FOR CONTROLLING AUTONOMOUS DRIVING VEHICLE

CROSS-REFERENCE TO RELATED APPLICATION

This application claims the benefit of priority to Korean Patent Application No. 10-2022-0177530, filed in the Korean Intellectual Property Office on Dec. 16, 2022, the entire contents of which are incorporated herein by reference.

TECHNICAL FIELD

The present disclosure relates to an autonomous driving control apparatus and a control method thereof, and more particularly relates to a technology for controlling deceleration of a vehicle in an autonomous driving state.

BACKGROUND

An autonomous driving vehicle refers to a vehicle that is able to assess risks by recognizing a driving environment, minimize a driver's driving operation by planning a driving route, and/or safely drives the vehicle by itself without the driver's direct operation.

One of the basic functionalities of an autonomous driving vehicle is driving while maintaining a specific distance from a leading vehicle. Vehicles in platooning drive may attempt to prevent an inter-vehicle distance and vehicle speed changes from propagating to rear vehicles in order to maintain string stability, which refers to the stability of the group of vehicles as a whole.

In case of rapid deceleration in platooning, string instability may occur where a vehicle group becomes unstable and consequently causes traffic congestion. For example, an autonomously driven vehicle, while following a leading vehicle, may need deceleration due to, for example, an intervening vehicle that cut into the travel lane. As such, when a vehicle temporarily decelerates, a vehicle may need rapid deceleration to strictly maintain a safe following distance away from the leading vehicle. When a leading vehicle decelerates rapidly, the inter-vehicle distance may be reduced, and a traffic flow may be momentarily congested.

Accordingly, there is a need for a method for controlling decelerating in an autonomous vehicle to reduce traffic congestion and prevent a collision.

SUMMARY

The present disclosure has been made to solve the above-mentioned problems occurring in the prior art while advantages achieved by the prior art are maintained intact.

An aspect of the present disclosure provides an autonomous driving control apparatus for minimizing traffic congestion while preventing collision, and a control method thereof.

An aspect of the present disclosure provides an autonomous driving control apparatus capable of reducing traffic congestion in response to diverse driving situations, and a control method thereof.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, an autonomous driving control apparatus may include: a sensor device configured to detect a leading vehicle of a host vehicle; a communication device configured to receive, from the leading vehicle, vehicle information of the leading vehicle; and one or more processors; and memory storing instructions. The instructions may, when executed by the one or more processors, cause the autonomous driving control apparatus to: based on a deceleration request of the host vehicle, operate in an excessive deceleration limit mode; and determine, based on the vehicle information of the leading vehicle, a speed control signal for changing a vehicle speed of the leading vehicle; and adjust, based on the speed control signal and while operating in the excessive deceleration limit mode, an excessive deceleration limit level of the host vehicle.

The instructions, when executed by the one or more processors, may cause the autonomous driving control apparatus to operate in the excessive deceleration limit mode further based on a requested acceleration of the host vehicle being less than a threshold acceleration value.

The speed control signal may include a brake-pedal position sensor (BPS) signal of the leading vehicle. The instructions, when executed by the one or more processors, may cause the autonomous driving control apparatus to adjust the excessive deceleration limit level by decreasing the excessive deceleration limit level based on a change amount of the BPS signal of the leading vehicle within a unit time duration being greater than or equal to a threshold value.

The speed control signal may include an accelerator position sensor (APS) signal of the leading vehicle. The instructions, when executed by the one or more processors, may cause the autonomous driving control apparatus to adjust the excessive deceleration limit level by increasing the excessive deceleration limit level based on a change amount of the APS signal of the leading vehicle within a unit time duration being greater than or equal to a threshold value.

The instructions, when executed by the one or more processors, may cause the autonomous driving control apparatus to determine the speed control signal based on a requested acceleration profile of the leading vehicle and based on the leading vehicle being in an autonomous driving mode.

The instructions, when executed by the one or more processors, may cause the autonomous driving control apparatus to adjust the excessive deceleration limit level by: increasing the excessive deceleration limit level based on a time-to-collision (TTC) value between the host vehicle and the leading vehicle being greater than or equal to a threshold time value.

The instructions, when executed by the one or more processors, may cause the autonomous driving control apparatus to adjust the excessive deceleration limit level by: increasing the excessive deceleration limit level based on a braking delay of the host vehicle being less than a threshold time value.

The instructions, when executed by the one or more processors, may cause the autonomous driving control apparatus to adjust the excessive deceleration limit level by: increasing the excessive deceleration limit level based on an acceleration of the leading vehicle exceeding a threshold acceleration value.

The instructions, when executed by the one or more processors, may cause the autonomous driving control apparatus to adjust the excessive deceleration limit level by: increasing the excessive deceleration limit level based on a communication delay of the host vehicle being less than a threshold time value.

The instructions, when executed by the one or more processors, may further cause the autonomous driving control apparatus to: perform artificial intelligence learning on at least one of: a time-to-collision (TTC) with respect to the leading vehicle, an acceleration of the leading vehicle, a braking delay of the host vehicle, a communication delay of the host vehicle, the speed control signal of the leading vehicle, or an acceleration profile of the leading vehicle.

According to one or more example embodiments of the present disclosure, an autonomous driving control method may include: operating, by a computing device, a host vehicle in an excessive deceleration limit mode based on a deceleration request of the host vehicle; receiving, from a leading vehicle, vehicle information of the leading vehicle, the vehicle information comprising an indication of a speed control signal for changing a vehicle speed of the leading vehicle; and adjusting, based on the speed control signal and while operating in the excessive deceleration limit mode, an excessive deceleration limit level of the host vehicle.

Operating of the host vehicle in the excessive deceleration limit mode may be further based on a requested acceleration of the host vehicle being less than a threshold acceleration value.

Adjusting of the excessive deceleration limit level may include: decreasing the excessive deceleration limit level based on a change amount of a brake-pedal position sensor (BPS) signal of the leading vehicle within a unit time duration is greater than or equal to a threshold value.

The speed control signal may include an accelerator position sensor (APS) signal of the leading vehicle. Adjusting of the excessive deceleration limit level may include: increasing the excessive deceleration limit level based on a change amount of the APS signal of the leading vehicle within a unit time duration being greater than or equal to a threshold value.

The method may further include: determining the speed control signal based on a requested acceleration profile of the leading vehicle and based on the leading vehicle being in an autonomous driving mode.

Adjusting of the excessive deceleration limit level may include: increasing the excessive deceleration limit level based on a time-to-collision (TTC) value between the host vehicle and the leading vehicle being greater than or equal to a threshold time value.

Adjusting of the excessive deceleration limit level may include: increasing the excessive deceleration limit level based on a braking delay of the host vehicle being less than a threshold time value.

Adjusting of the excessive deceleration limit level may include: increasing the excessive deceleration limit level based on an acceleration of the leading vehicle exceeding a threshold acceleration value.

Adjusting of the excessive deceleration limit level may include: increasing the excessive deceleration limit level based on a communication delay of the host vehicle being less than a threshold time value.

Adjusting of the excessive deceleration limit level may include: perform artificial intelligence learning on at least one of: a time-to-collision (TTC) with respect to the leading vehicle, an acceleration of the leading vehicle, a braking delay of the host vehicle, a communication delay of the host vehicle, the speed control signal of the leading vehicle, or an acceleration profile of the leading vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
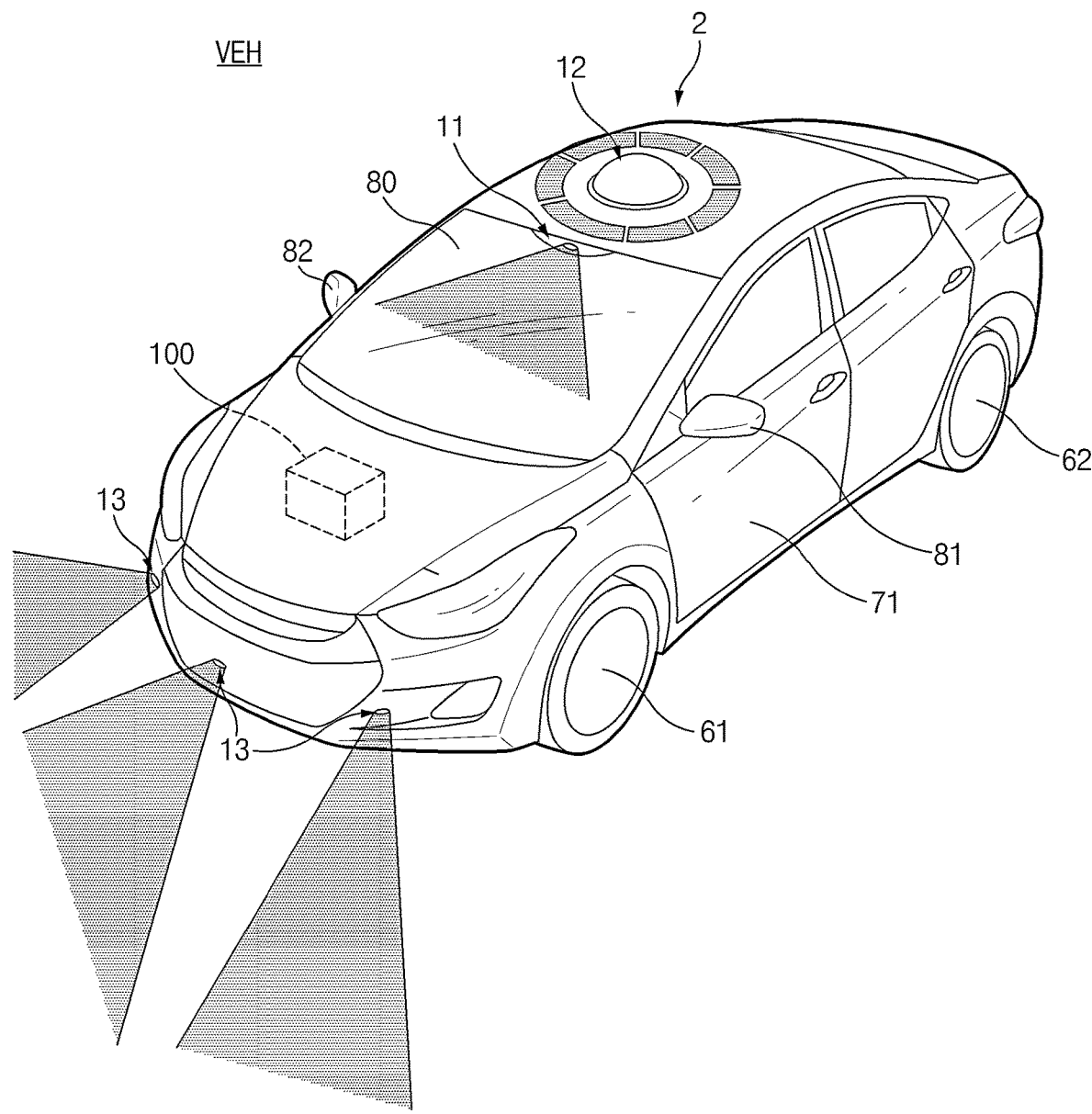
FIG. 1 is a diagram showing a vehicle including an autonomous driving control device.

Hereinafter, some embodiments of the present disclosure will be described in detail with reference to the accompanying drawings. In adding reference numerals to components of each drawing, it should be noted that the same components have the same reference numerals, although they are indicated on another drawing. In describing embodiments of the present disclosure, detailed descriptions associated with well-known functions or configurations will be omitted when they may make subject matters of the present disclosure unnecessarily obscure.

In describing components of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 13.

FIG. 1 is a diagram showing a vehicle (e.g., a host vehicle) including an autonomous driving control device. An autonomous driving vehicle may be a vehicle belonging to autonomous driving level 1 to autonomous driving level 5.

Referring to FIG. 1, a vehicle VEH may include a body 2, wheels 61 and 62, a door 71, a windshield 80, side mirrors 81 and 82, a sensor device 10, and a processor 100.

The vehicle VEH may be an electrification-based vehicle such as an electric vehicle (EV), a hybrid electric vehicle (HEV), a plug-in hybrid electric vehicle (PHEV), or a fuel cell electric vehicle (FCEV).

The body 2 may be a structure constituting an external appearance of the vehicle VEH.

The wheels 61 and 62 may include the front wheel 61 provided at the front of the vehicle and the rear wheel 62 provided at the rear of the vehicle. The front wheel 61 and the rear wheel 62 may be rotated by a driving device to move the vehicle VEH.

The door 71 may be provided on the left and right sides of the body 2 so as to be opened such that occupants are capable of boarding the vehicle VEH when the door 71 is opened. When the door 71 is closed, the inside of the vehicle VEH may be shielded from the outside.

The windshield 80, which is a kind of a windscreen, may be provided on the front upper side of the body 2 and may provide forward vision information of the vehicle VEH to a driver or a user inside the vehicle VEH.

The side mirrors 81 and 82 may include the left side mirror 81 provided on the left side of the body 2 and the right side mirror 82 provided on the right side of the body 2, and may provide a driver inside the vehicle VEH with information about the rear view of the vehicle VEH The sensor device 10 may include a camera 11 and light imaging detection and ranging (LIDAR) 12, and a location where the camera 11 and the LIDAR 12 are mounted may not be limited to what is shown in FIG. 1.

The processor 100 may perform an algorithm for controlling autonomous driving.

The detailed configuration of the autonomous driving control apparatus is as follows.

Figure 2:
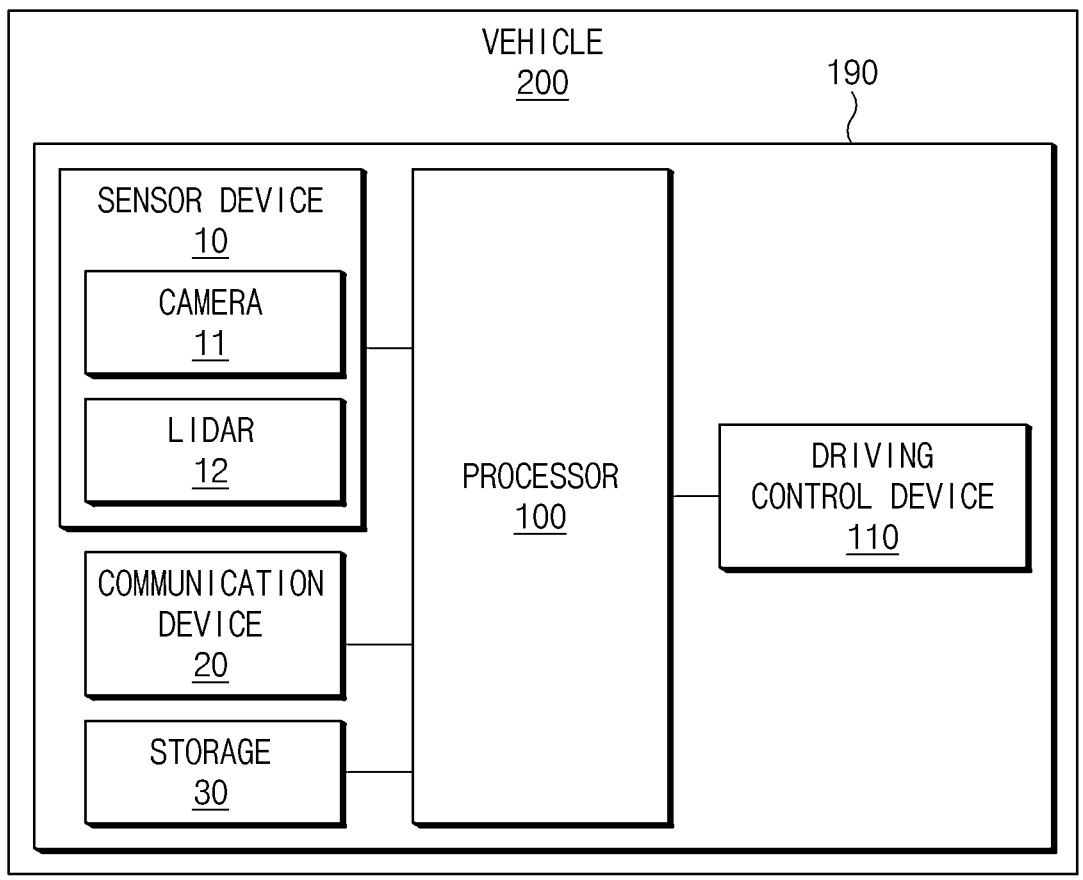
FIG. 2 is a block diagram illustrating a configuration of an autonomous driving control apparatus.

FIG. 2 is a block diagram illustrating a configuration of an autonomous driving control apparatus. An autonomous driving control apparatus 190 may be implemented inside a vehicle (e.g., a host vehicle). At this time, the autonomous driving control apparatus 190 may be integrated with internal control units of a vehicle and may be implemented with a separate device so as to be connected to control units of the vehicle by means of a separate connection means.

Referring to FIG. 2, the autonomous driving control apparatus 190 may include the sensor device 10, a communication device 20, storage 30, the processor 100, a driving control device 110, and an alarm device 120.

The sensor device 10 may include the camera 11 and the LIDAR 12 for detecting external objects of a vehicle, particularly vehicles located in front or rear of the vehicle.

To obtain an external image of the vehicle, the camera may be located at an appropriate location outside the vehicle (e.g., a front of the vehicle, a rear of the vehicle, a right side mirror of the vehicle, and a left side mirror of the vehicle) The camera 11 may be a mono camera, a stereo camera, an around view monitoring (AVM) camera, or a 360-degree camera.

To obtain a front image of the vehicle, the camera 11 may be positioned inside the vehicle to be close to a front windshield, and may be positioned around the front bumper or radiator grille.

To obtain a side image of the vehicle, the camera 11 may be positioned to be close to at least one of side windows inside a vehicle. Also, the camera 11 may be positioned around a fender or door.

The LIDAR 12 may include a laser transmission module and a laser reception module. The LIDAR 12 may be implemented in a time-of-flight (TOF) method or a phase-shift method. To detect an object located at the front of the vehicle, the rear of the vehicle, or the side of the vehicle, the LIDAR 12 may be exposed to the outside of the vehicle.

Moreover, the sensor device 10 may include radio detection and ranging (RADAR), an ultrasonic sensor, or an infrared sensor.

The radar may include an electromagnetic wave transmission module and an electromagnetic wave reception module. The radar may be implemented in a pulse radar method or a continuous wave radar method in view of the radio emission principle. The radar may be implemented in a frequency modulated continuous wave (FMCW) method or a frequency shift keying (FSK) method depending on a signal waveform among continuous wave radar methods. In the TOF method or a phase-shift method, the radar may detect an object and may detect a location of the detected object, a distance to the detected object, and a relative speed by using electromagnetic waves.

The ultrasonic sensor may include an ultrasonic transmission module and an ultrasonic reception module. The ultrasonic sensor may detect an object based on ultrasonic waves and may detect a position of the detected object, a distance to the detected object, and a relative speed. The ultrasonic sensor may be positioned at an appropriate location outside the vehicle to detect an object located at the front of the vehicle, the rear of the vehicle, or the side of the vehicle.

The infrared sensor may include an infrared transmission module and an infrared reception module. The infrared sensor may detect an object based on infrared light and may detect a position of the detected object, a distance to the detected object, and a relative speed. The infrared sensors may be positioned outside the vehicle to detect objects located at the front of the vehicle, the rear of the vehicle, or the side of the vehicle.

In addition, the sensor device 10 may include a brake-pedal position sensor (BPS) and an accelerator position sensor (APS) that generate a speed control command for adjusting the speed of a vehicle (e.g., a host vehicle).

The BPS may output a BPS signal depending on the degree of depression of the brake pedal provided in the vehicle. For example, the BPS signal may output data having a range from 0 to depending on the depression of the brake pedal. A value of 0 may indicate that the brake pedal is not depressed, and a value of 100 may indicate that the brake pedal is maximally depressed.

The APS may output an APS signal depending on the degree of depression of an accelerator pedal provided in the vehicle. For example, the APS signal may output data having a range from 0 to 100 depending on the depression of the accelerator pedal. A value of 0 may indicate that the accelerator pedal is not depressed, and a value of 100 may indicate that the accelerator pedal is maximally depressed.

The communication device 20 may communicate with a user terminal, another vehicle, or an external server.

The communication device 20 may perform short range communication, GPS signal reception, vehicle-to-everything (V2X) communication, optical communication, broadcast transmission/reception, and intelligent transport systems (ITS) communication functions.

The communication device 20 may support the short range communication by using at least one of Bluetooth™, radio frequency identification (RFID), infrared data association (IrDA), ultra wideband (UWB), ZigBee, near field communication (NFC), Wi-Fi, Wi-Fi Direct, or wireless universal serial bus (Wireless USB) technologies.

The communication device 20 may include a global positioning system (GPS) module or a differential global positioning system (DGPS) module to obtain location information.

Moreover, the communication device 20 may include a V2X communication module. The V2X communication module may include an RF circuit for a wireless communication protocol with a server (vehicle-to-infrastructure (V2I)), another vehicle (vehicle-to-vehicle (V2V)), or a pedestrian (vehicle-to-pedestrian (V2P)).

The communication device 20 may exchange a wireless signal with at least one of a base station, an external terminal, or a center on a mobile communication network established according to technical standards or communication methods for mobile communication. For example, the communication device 20 may perform communication based on global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), or long term evolution-advanced (LTE-A). The wireless signal may include various types of data according to transmission/reception of a voice call signal, a video call signal, or a text/multimedia message.

The storage 30 may store an algorithm for an operation of the processor 100 and an AI processor. The storage 30 may use a hard disk drive, a flash memory, an electrically erasable programmable read-only memory (EEPROM), a static random access memory (SRAM), a ferro-electric RAM (FRAM), a phase-change RAM (PRAM), or a magnetic RAM (MRAM), a dynamic RAM (DRAM), a synchronous DRAM (SDRAM), a double date rate-SDRAM (DDR-SDRAM), and the like.

The processor 100 may operate an excessive deceleration limit mode based on a deceleration request of a host vehicle. The host vehicle may refer to a vehicle to which one or more embodiments of the present disclosure are applied and is controlled by an autonomous driving control apparatus.

The deceleration request may be determined based on the requested acceleration of a host vehicle. For example, the processor 100 may operate an excessive deceleration limit mode by determining that there is a deceleration request, based on an event that the requested acceleration of the host vehicle is less than a predetermined threshold acceleration. The requested acceleration may be the acceleration of the host vehicle calculated for the host vehicle's system to maintain a following distance away from a leading vehicle (also referred to as a "forward vehicle" or a "preceding vehicle").

The excessive deceleration limit mode refers to an operating mode in which an excessive deceleration of a host vehicle is limited such that it is not necessary to strictly maintain the following distance with the leading vehicle in consideration of a traffic flow even if the following distance with respect to the leading vehicle is temporarily shortened or expected to be shortened. For example, when there is a cut-in vehicle in heavy traffic, the processor 100 may maintain a smooth traffic flow by limiting emergency braking even if the following distance with the cut-in vehicle temporarily decreases. The excessive deceleration limit mode may be classified into levels, and each excessive deceleration limit level may be adjusted such that the deceleration degrees of a vehicle are different from each other.

The classification of excessive deceleration limit level may vary depending on a design. For example, the excessive deceleration limit level may be set in three steps as shown in Table 1.

TABLE 1

| Excessive deceleration limit level | Acceleration to be applied |
| --- | --- |
| Level 1 | $-a1$ m/s$^2$ |
| Level 2 | $-a2$ m/s$^2$ |
| Level 3 | $-a3$ m/s$^2$ |

In Table 1, an absolute value of a first acceleration ($-a1$) may be set to be greater than an absolute value of a second acceleration ($-a2$). An absolute value of a third acceleration ($-a3$) may be set to be less than the absolute value of the second acceleration ($-a2$).

In a normal state, the excessive deceleration limit level may be set to level 2, and the second acceleration may be $-a2$ m/s$^2$. That is, at level 2, the processor 100 may decelerate a vehicle to the second acceleration ($-a2$) in a process of decelerating the host vehicle in a specific situation.

When increasing the excessive deceleration limit level, the processor 100 may decelerate the host vehicle to the third acceleration ($-a3$) corresponding to level 3. Because the third acceleration ($-a3$) is less than the second acceleration ($-a2$), a speed change of the host vehicle may be smaller than a speed change at the second level when the excessive deceleration limit level is increased.

When decreasing the excessive deceleration limit level, the processor 100 may decelerate the host vehicle to the first acceleration ($-a1$) corresponding to level 1. Because the first acceleration ($-a1$) is greater than the second acceleration ($-a2$), a speed change of the host vehicle may be greater than a speed change at the second level when the excessive deceleration limit level is decreased.

The excessive deceleration limit level may be further subdivided. For example, the excessive deceleration limit level may be divided into five steps. In a normal state, the excessive deceleration limit level may be set to three steps. The excessive deceleration limit level may be set as level 4 or level 5 depending on a variable level of a condition that the excessive deceleration limit level is increased. For example, the excessive deceleration limit level may be selected from level 1 to level 5 depending on a range of the expected collision occurrence time.

The processor 100 may identify vehicle information of a vehicle or a leading vehicle in the excessive deceleration limit mode.

The processor 100 may identify the braking delay and communication delay of the host vehicle.

Moreover, the processor 100 may identify a speed control signal, driving state, system requested acceleration profile, and acceleration of the leading vehicle. The speed control signal may be a control signal for changing a vehicle speed, and may be divided into a case where the leading vehicle is in a manual driving state and a case where the leading vehicle is in an autonomous driving state. If the leading vehicle is in the manual driving state, the speed control signal may include a BPS signal and an APS signal. If the leading vehicle is in the autonomous driving state, the speed control signal may be identified based on the system requested acceleration profile of the leading vehicle. The system requested acceleration profile may be a requested acceleration calculated in real time in an autonomous driving system depending on a driving condition.

The processor 100 may receive vehicle information of a leading vehicle through a V2X communication module.

The processor 100 may adjust an excessive deceleration limit level based on vehicle information of a vehicle or vehicle information of a leading vehicle.

The processor 100 may identify a speed control signal in vehicle information of a leading vehicle, and may adjust the excessive deceleration limit level based on the speed control signal. For example, the processor 100 may increase the excessive deceleration limit level based on a change amount of the APS signal of the leading vehicle, and then may decrease the excessive deceleration limit level based on a change amount of the BPS signal of the leading vehicle.

Various embodiments of adjusting the excessive deceleration limit level based on vehicle information will be described later.

Furthermore, the processor 100 may detect a surrounding vehicle and may perform artificial intelligence learning for adjusting an excessive deceleration limit level. To this end, the processor 100 may include an artificial intelligence (AI) processor. The AI processor may learn a neural network by using a pre-stored program. The neural network for detecting a target vehicle and a dangerous vehicle may be designed to simulate a human brain structure on a computer, and may include a plurality of network nodes, each of which has a weight and which simulate neurons of a human neural network. The plurality of network modes may exchange data depending on each connection relationship such that neurons simulate synaptic activity of neurons that exchange signals through synapses. The neural network may include a deep learning model developed from a neural network model. In the deep learning model, a plurality of network nodes may exchange data depending on a convolution connection relationship while being located on different layers. Examples of neural network models may include various deep learning techniques such as deep neural networks (DNN), convolutional deep neural networks (CNN), recurrent neural networks (RNN), restricted Boltzmann machine (RBM), deep belief networks (DBN), and deep Q-networks.

The driving control device 110 may be used to vary the speed of a vehicle in response to a control signal from the processor 100, and may include an engine control module, a brake control module, and a transmission control module.

The engine control module controls the acceleration of the vehicle 200 (e.g., a host vehicle), as an actuator that controls the engine of a vehicle. The engine control module may be implemented with an engine management system (EMS). The engine control module controls the driving torque of an engine depending on accelerator pedal location information output from an accelerator pedal location sensor. The engine control module controls the output of an engine to follow the driving speed of the host vehicle requested by the processor 100 during autonomous driving.

The brake control module may be implemented with an electronic stability control (ESC), as an actuator that controls the deceleration of the host vehicle. The brake control module controls the brake pressure for the purpose of following the target speed requested by the processor 100 during autonomous driving. That is, the brake control module controls the deceleration of the host vehicle.

The transmission control module is an actuator for controlling the transmission of a vehicle, and controls the transmission of the host vehicle depending on a gear location and a gear state range.

Figure 3:
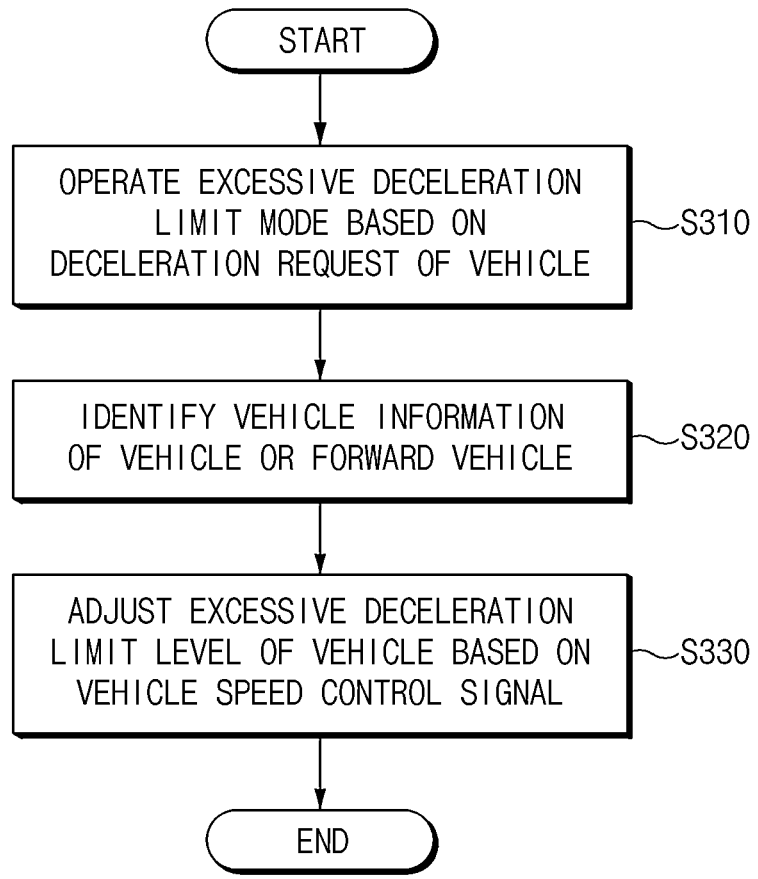
FIG. 3 is a flowchart illustrating an autonomous driving control method.

FIG. 3 is a flowchart illustrating an autonomous driving control method. Referring to FIG. 3, an autonomous driving control method will be described as follows.

In S310, the processor 100 may operate an excessive deceleration limit mode based on a deceleration request of a vehicle.

Figure 4:
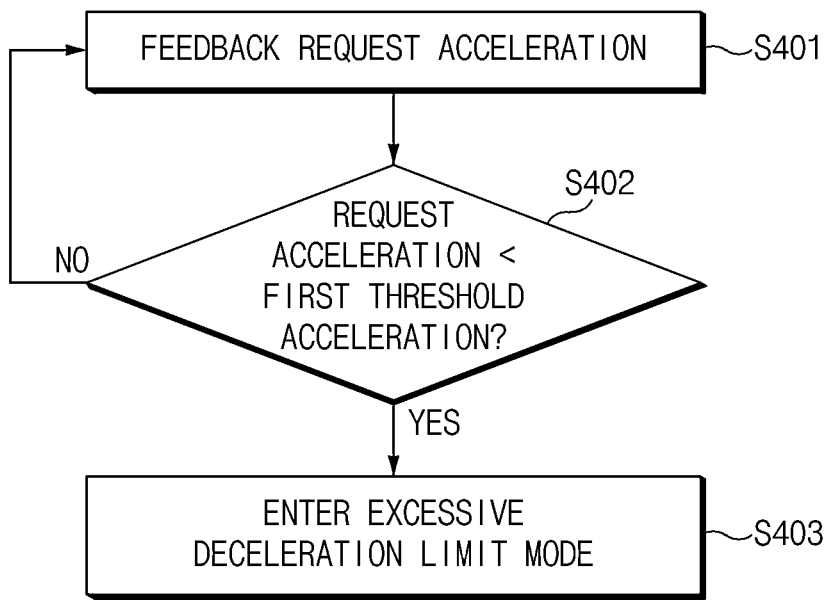
FIG. 4 is a diagram illustrating an excessive deceleration limit mode entry procedure.

FIG. 4 is a diagram illustrating an excessive deceleration limit mode entry procedure.

As illustrated in FIG. 4, the processor 100 may operate an excessive deceleration limit mode based on a vehicle's requested acceleration. Because a vehicle has a very low risk of collision with a leading vehicle and is accelerating, it may be determined that there is no need to operate an excessive deceleration limit mode if the requested acceleration is calculated to be great.

Accordingly, if a requested acceleration is less than a predetermined first threshold acceleration, the processor 100 may operate an excessive deceleration limit mode. The first threshold acceleration may be set at a level at which it is determined that the host vehicle is not accelerated.

Furthermore, the processor 100 may identify an avoidance system state of a vehicle to operate the excessive deceleration limit mode. If the avoidance system state is not normal, the processor 100 may not enter the excessive deceleration limit mode.

In S320, the processor 100 may identify vehicle information of a vehicle or a leading vehicle in the excessive deceleration limit mode.

The processor 100 may identify the braking delay and communication delay of the host vehicle.

Besides, the processor 100 may receive vehicle information of a leading vehicle through a V2X communication module. The processor 100 may identify the speed control signal of the leading vehicle. The speed control signal may be a control signal for changing a vehicle speed, and may include a BPS signal and an APS signal.

In S330, the processor 100 may identify the speed control signal for changing a vehicle speed from the vehicle information of a leading vehicle, and may adjust the excessive deceleration limit level of the host vehicle based on the speed control signal.

To this end, the processor 100 may determine the amount of change in the APS signal or BPS signal of the leading vehicle within a unit time. The unit time may be set in advance, and may be set to a time for determining the moment when the leading vehicle increases or decreases the vehicle speed.

The processor 100 may decrease the excessive deceleration limit level based on an event that a change amount of the BPS signal of the leading vehicle within a unit time is not than a first threshold value.

That is, the processor 100 may determine that the leading vehicle is attempting deceleration, based on a change amount of the BPS signal. If the leading vehicle decelerates, it may be necessary to increase the amount of deceleration because time-to-collision (TTC) between a vehicle and a leading vehicle decreases. Accordingly, the processor 100 may decrease the excessive deceleration limit level based on a change in the BPS signal.

The processor 100 may increase the excessive deceleration limit level based on an event that a change amount of the APS signal of the leading vehicle within a unit time is not than a second threshold value. That is, the processor 100 may determine that the leading vehicle is attempting acceleration, based on a change amount of the APS signal. If the leading vehicle accelerates, the TTC between the host vehicle and the leading vehicle increases, and thus reducing the deceleration may not affect safe driving. Accordingly, the processor 100 may increase the excessive deceleration limit level based on a change in the APS signal.

Hereinafter, various embodiments of adjusting the excessive deceleration limit level will be described with reference to FIGS. 5 to 12.

Figure 5:
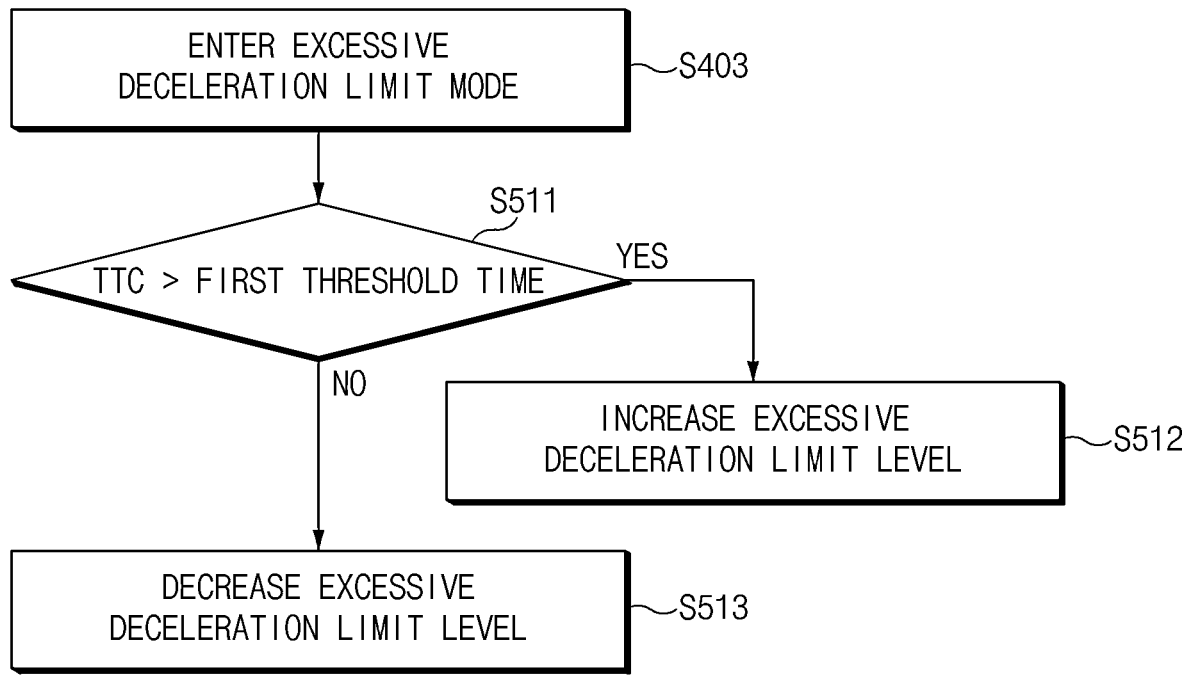
FIG. 5 is a flowchart for describing adjustment of an excessive deceleration limit level based on TTC.
Figure 6:
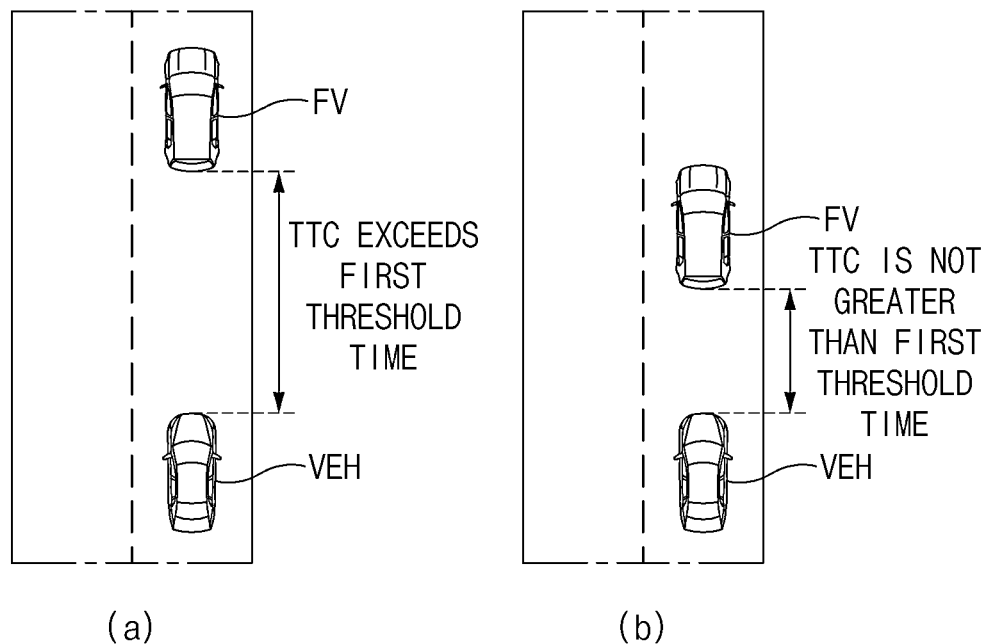
FIG. 6 is a diagram for describing TTC.

FIG. 5 is a flowchart for describing adjustment of an excessive deceleration limit level based on TTC. FIG. 6 is a diagram for describing TTC. Adjustment of an excessive deceleration limit level will be described based on TTC.

In S403, the processor 100 may operate an excessive deceleration limit mode. S403 may be the same procedure as S403 shown in FIG. 4.

In S511, the processor 100 may compare the TTC with a second threshold time.

In S512, if the TTC exceeds the second threshold time, the processor 100 may increase the excessive deceleration limit level. If the TTC exceeds the second threshold time, it is determined that the vehicle VEH (e.g., a host vehicle) has a low risk of collision with a leading vehicle FV, and thus the amount of deceleration may be reduced even if deceleration is necessary by increasing the excessive deceleration limit level.

In S513, if the TTC is not greater than the second threshold time, the processor 100 may decrease the excessive deceleration limit level. If the TTC is not greater than the second threshold time, it is determined that the vehicle VEH has a high risk of collision with the leading vehicle FV, and thus it is possible to increase the amount of deceleration by decreasing the excessive deceleration limit level. As the excessive deceleration limit level is decreased, the vehicle VEH may be decelerated to a level close to a requested acceleration of a system.

Figure 7:
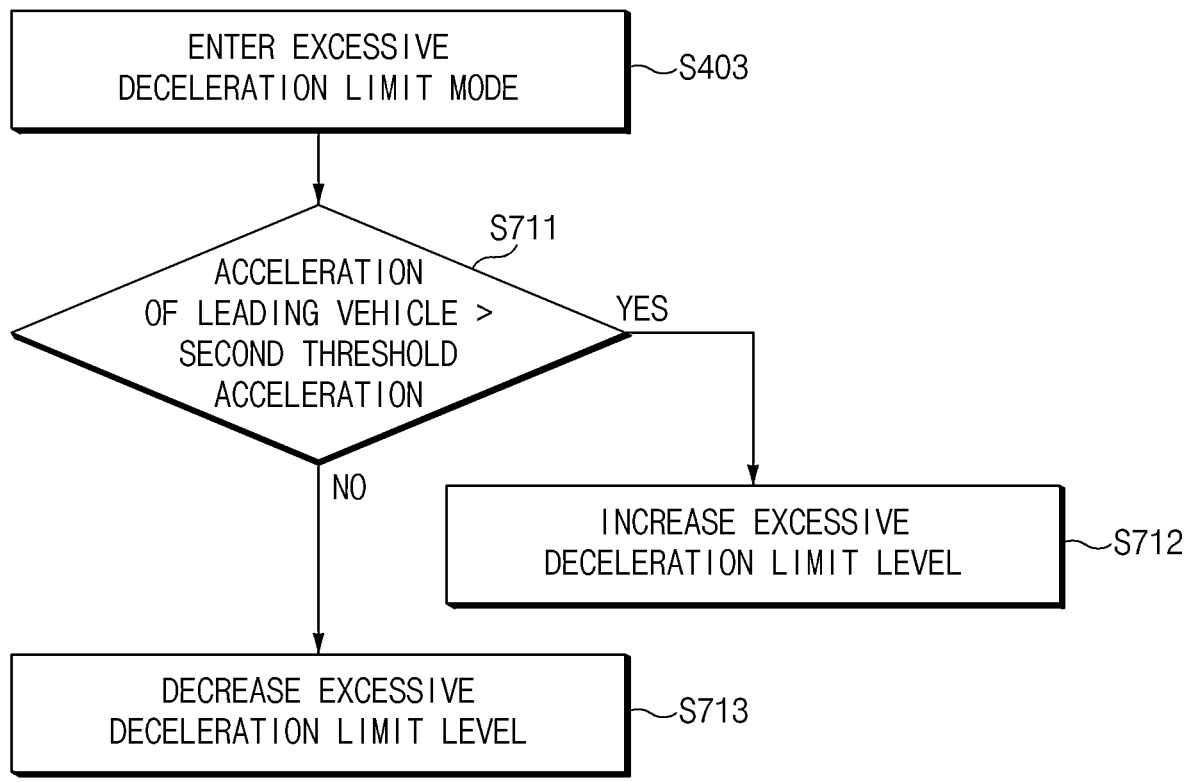
FIG. 7 is a flowchart illustrating adjustment of an excessive deceleration limit level based on acceleration of a forward vehicle.

FIG. 7 is a flowchart illustrating adjustment of an excessive deceleration limit level based on acceleration of a leading vehicle. An example of adjusting an excessive deceleration limit level based on the acceleration of a leading vehicle is as follows.

In S403, the processor 100 may operate an excessive deceleration limit mode. S403 may be the same procedure as S403 shown in FIG. 4.

In S711, the processor 100 may identify the acceleration of a leading vehicle. To this end, the processor 100 may receive vehicle information from the leading vehicle through a V2X communication module and then may identify acceleration information in the vehicle information.

In S712, if the acceleration of the leading vehicle exceeds a second threshold acceleration, the processor 100 may increase the excessive deceleration limit level.

Moreover, in S713, if the acceleration of the leading vehicle is not greater than the second threshold acceleration, the processor 100 may decrease the excessive deceleration limit level.

Figure 8:
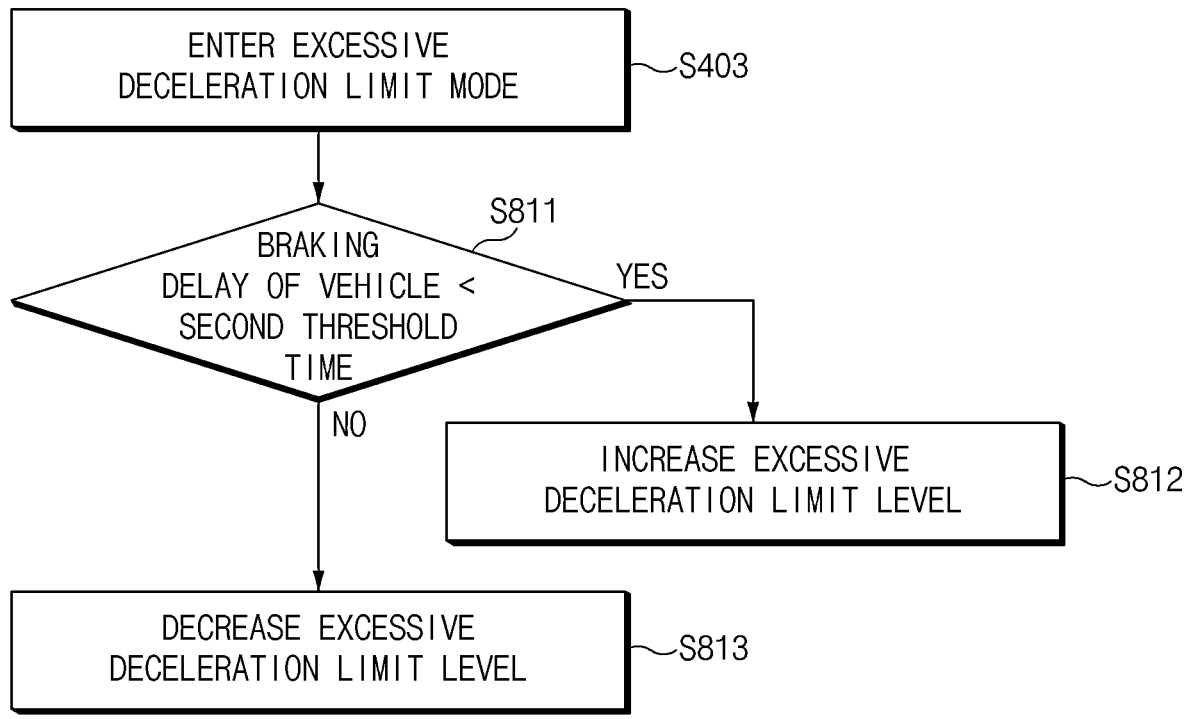
FIG. 8 is a flowchart for describing adjustment of an excessive deceleration limit level based on a braking delay of a vehicle.

FIG. 8 is a flowchart for describing adjustment of an excessive deceleration limit level based on a braking delay of a vehicle. An example of adjusting an excessive deceleration limit level based on the braking delay of a vehicle is as follows.

In S403, the processor 100 may operate an excessive deceleration limit mode. S403 may be the same procedure as S403 shown in FIG. 4.

In S811, the processor 100 may determine the braking delay of a vehicle.

In S812, if the braking delay of the host vehicle is less than a second threshold time, the processor 100 may increase the excessive deceleration limit level.

In S813, if the braking delay of the host vehicle is greater than the second threshold time, the processor 100 may decrease the excessive deceleration limit level.

Figure 9:
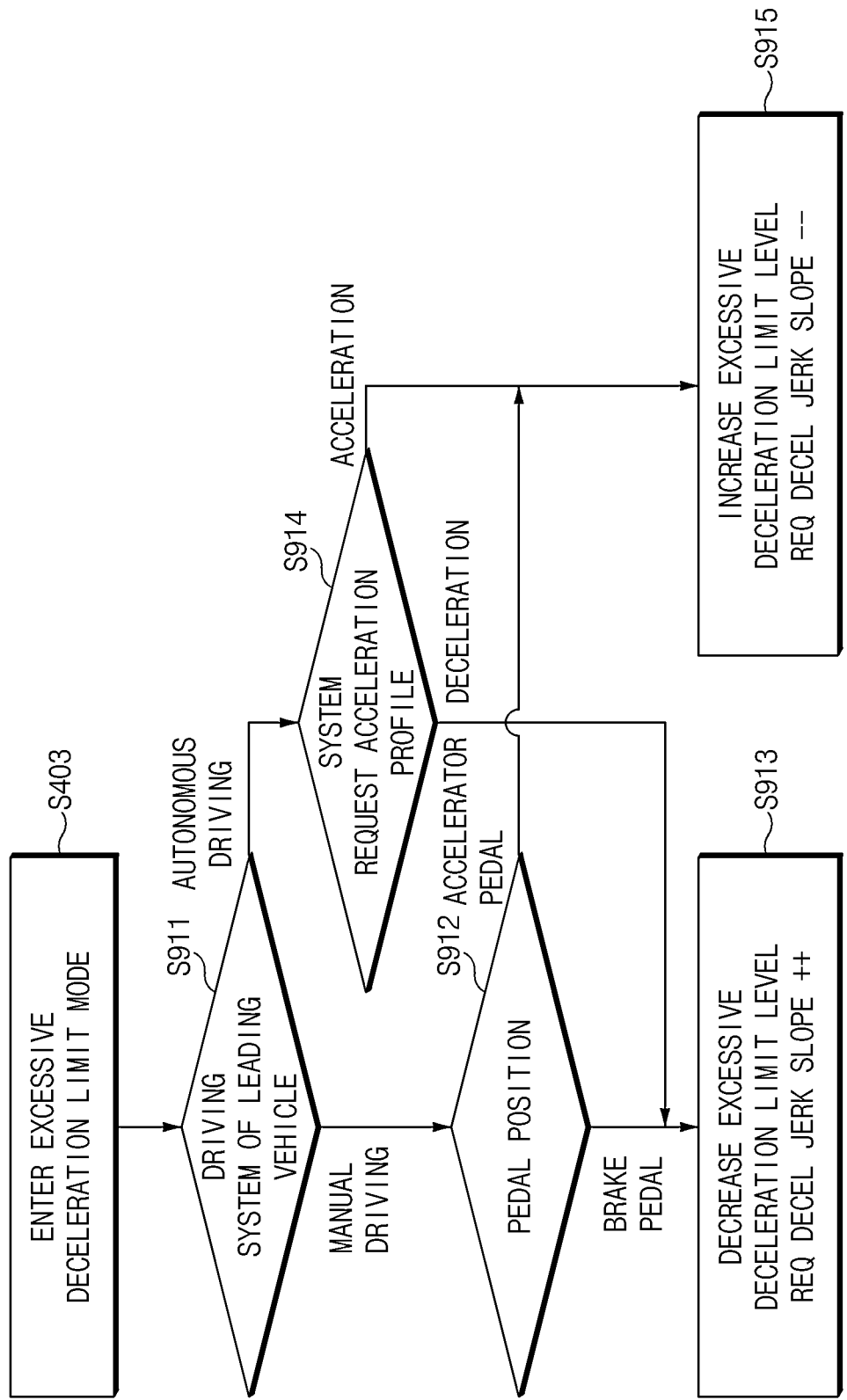
FIG. 9 is a flowchart illustrating adjustment of an excessive deceleration limit level based on a speed control signal of a forward vehicle.

FIG. 9 is a flowchart illustrating adjustment of an excessive deceleration limit level based on a speed control signal of a leading vehicle. An example of adjusting an excessive deceleration limit level based on a speed control signal of a leading vehicle is as follows.

In S403, the processor 100 may operate an excessive deceleration limit mode. S403 may be the same procedure as S403 shown in FIG. 4.

In S911, the processor 100 may identify a driving system of a leading vehicle based on vehicle information received from the leading vehicle through a V2X communication module. That is, the processor 100 may determine whether the leading vehicle is driving in a manual driving or an autonomous driving.

In S912, if the leading vehicle is driving in a manual driving, the processor 100 may determine whether there is a change in a pedal position. The pedal position includes a brake pedal position and an accelerator pedal position. The processor 100 may determine whether there is a change in the pedal position, based on a BPS signal or an APS signal.

In S913, the processor 100 may decrease the excessive deceleration limit level based on a position change of the brake pedal. To determine the position change of the brake pedal, the processor 100 may identify the amount of change in the BPS signal.

For example, if a change amount of the BPS signal within a unit time duration is not less than a first threshold value, the processor 100 may determine that a position change of the brake pedal occurs.

In S915, the processor 100 may increase an excessive deceleration limit level based on a position change of the accelerator pedal. To determine the position change of the accelerator pedal, the processor 100 may determine the amount of change in the APS signal. For example, if a change amount of the APS signal within a unit time duration is not less than a second threshold value, the processor 100 may determine that a position change of the accelerator pedal occurs.

If the leading vehicle is in an autonomous driving, in S914, the processor 100 may determine a system requested acceleration profile of the leading vehicle.

If a requested acceleration of a rear vehicle causes deceleration, the processor 100 may decrease the excessive deceleration limit level by proceeding to S913.

Alternatively, if a requested acceleration of a front vehicle causes acceleration, the processor 100 may increase the excessive deceleration limit level by proceeding to S915.

Figure 10:
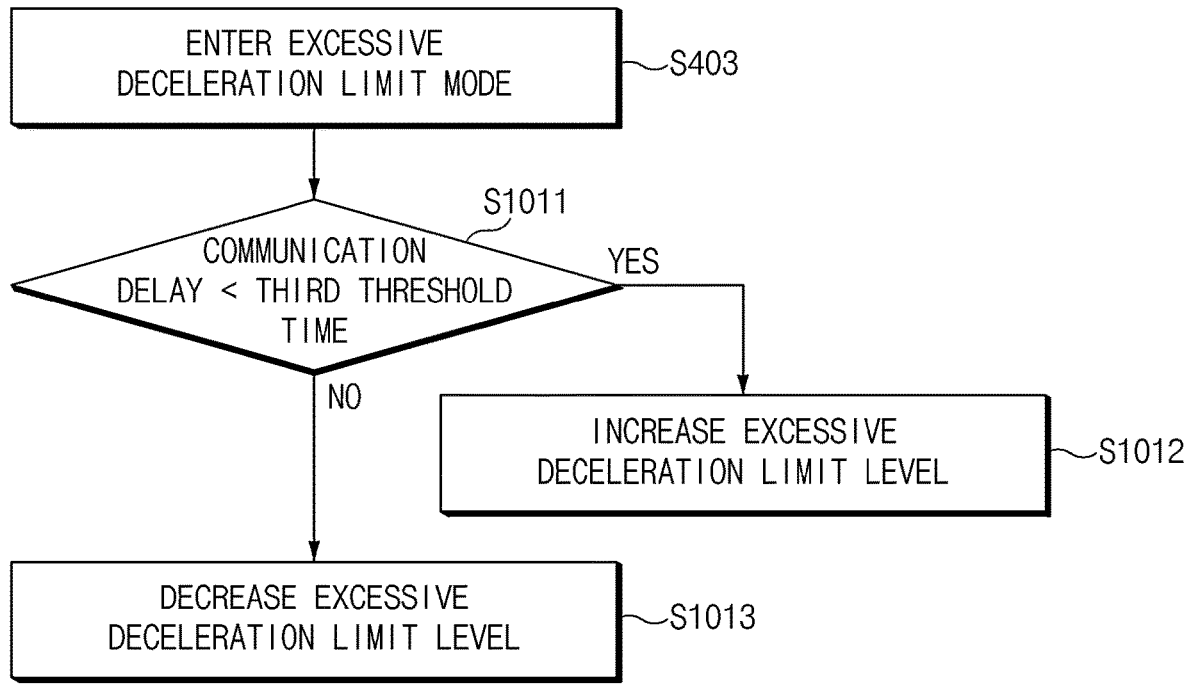
FIG. 10 is a flowchart for describing adjustment of an excessive deceleration limit level based on a communication delay of a vehicle.

FIG. 10 is a flowchart for describing adjustment of an excessive deceleration limit level based on a communication delay of a vehicle. An example of adjusting an excessive deceleration limit level based on the communication delay of a vehicle is as follows.

In S403, the processor 100 may operate an excessive deceleration limit mode. S403 may be the same procedure as S403 shown in FIG. 4.

In S1011, the processor 100 may determine the communication delay of the host vehicle.

In S1012, if the communication delay of the host vehicle is less than a third threshold time, the processor 100 may increase the excessive deceleration limit level.

In S1013, if the communication delay of the host vehicle is not less than the third threshold time, the processor 100 may decrease the excessive deceleration limit level. Because it takes more time to determine a driving state of the leading vehicle as the communication delay increases, the processor 100 may decrease the excessive deceleration limit level such that the limit of the deceleration becomes smaller as the communication delay increases.

Figure 11:
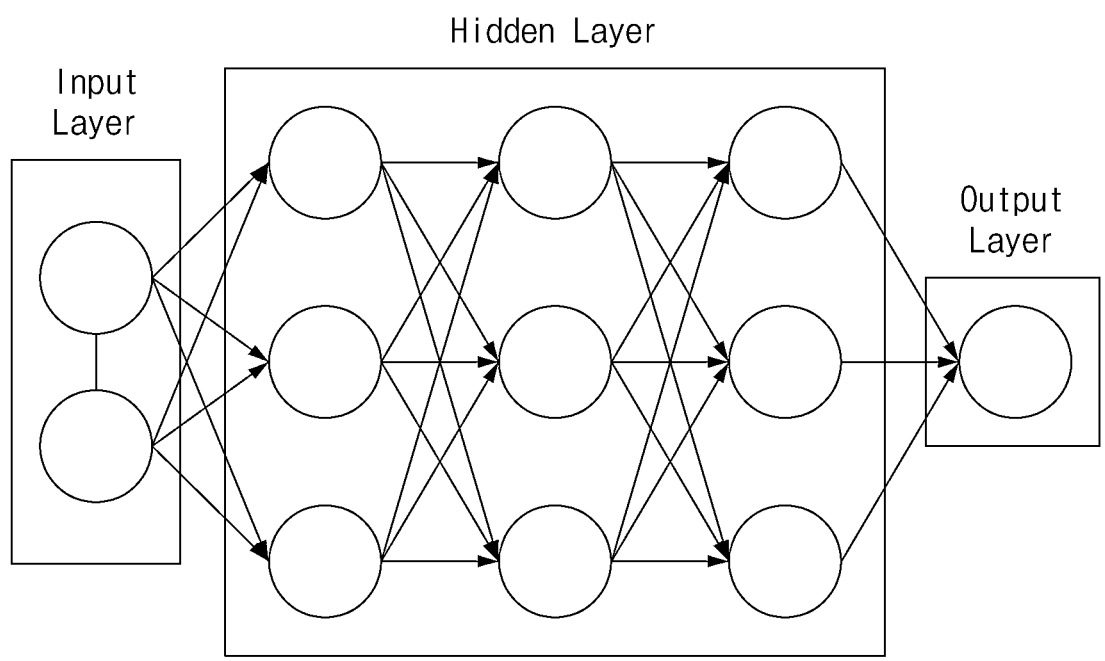
FIG. 11 is a schematic diagram of an artificial neural network (ANN) for autonomous driving control.

FIG. 11 is a schematic diagram of an artificial neural network (ANN) for autonomous driving control.

Referring to FIG. 11, the ANN for autonomous driving control is obtained by mathematically modeling a form in which human neurons are connected, and may include an input layer, a hidden layer, and an output layer.

The input layer may multiply input data by a weight matrix and may provide the multiplied result to the hidden layer. The input data may be variables used to adjust an excessive deceleration limit level. For example, the input layer may include at least one of TTC, an acceleration of a leading vehicle, a braking delay of a vehicle, a communication delay of the host vehicle, a speed control signal of the leading vehicle, an acceleration profile of the leading vehicle, or a combination thereof.

The hidden layer may process the input data based on an activation function. Moreover, the hidden layer may multiply the processed input data by a new weight matrix and may deliver the multiplied result to the output layer.

The output layer may output a result by reflecting the activation function for output. The output layer may output the excessive deceleration limit level as an output value.

Figure 12:
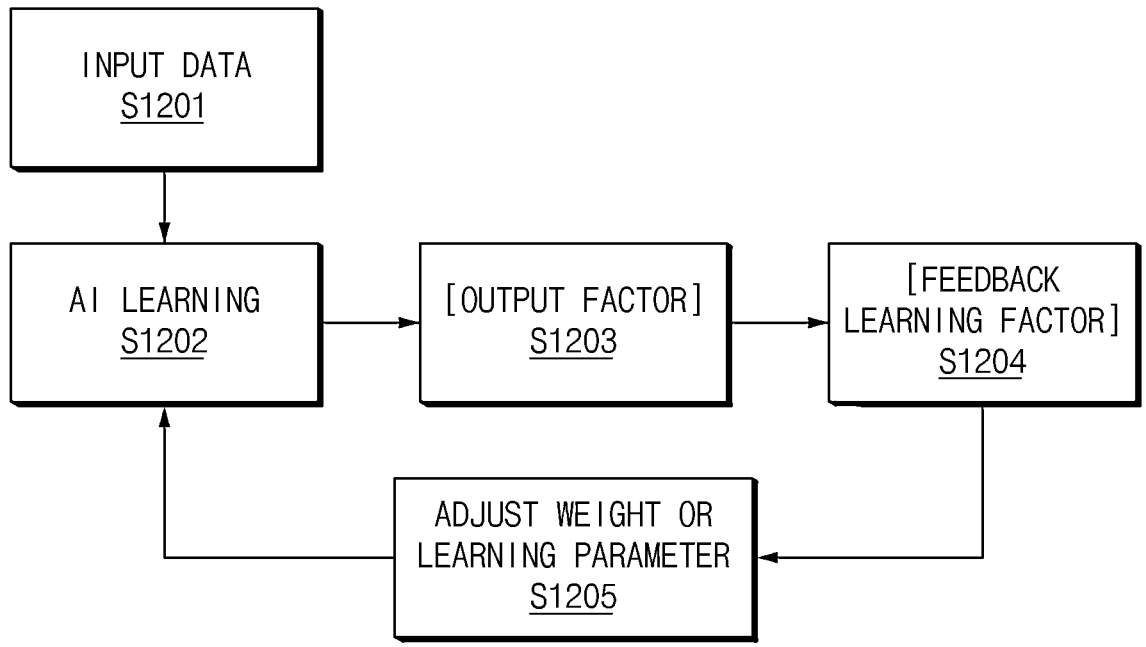
FIG. 12 is a diagram illustrating an autonomous driving control method based on reinforcement learning; and, FIG. 13 is a block diagram illustrating a computing system.

FIG. 12 is a diagram illustrating an autonomous driving control method based on reinforcement learning.

Referring to FIG. 12, a reinforcement learning-based autonomous driving control method will be described as follows.

In S1201 and S1202, the processor 100 may perform AI learning based on input data. The input data may include at least one of TTC, an acceleration of a leading vehicle, a braking delay of a vehicle, a communication delay of the host vehicle, a speed control signal of the leading vehicle, an acceleration profile of the leading vehicle, or a combination thereof.

In S1203, the processor 100 may output an output factor. The output factor may include an excessive deceleration limit level control factor.

In S1204, the processor 100 may identify a feedback learning factor. The feedback learning factor may be the steering operation or braking operation of a driver. For example, the processor 100 may adjust the excessive deceleration limit level based on the result of S1203 and then may determine whether a steering operation or a braking operation is requested from the driver.

In S1205, the processor 100 may adjust a weight or learning parameter of an AI processor based on the feedback learning factor after adjusting the excessive deceleration limit level. If there is a driving operation from a driver in S1204, it may be determined that settings of the excessive deceleration limit level are not optimal, and thus a procedure for optimizing AI learning may be performed in S1205.

Figure 13:
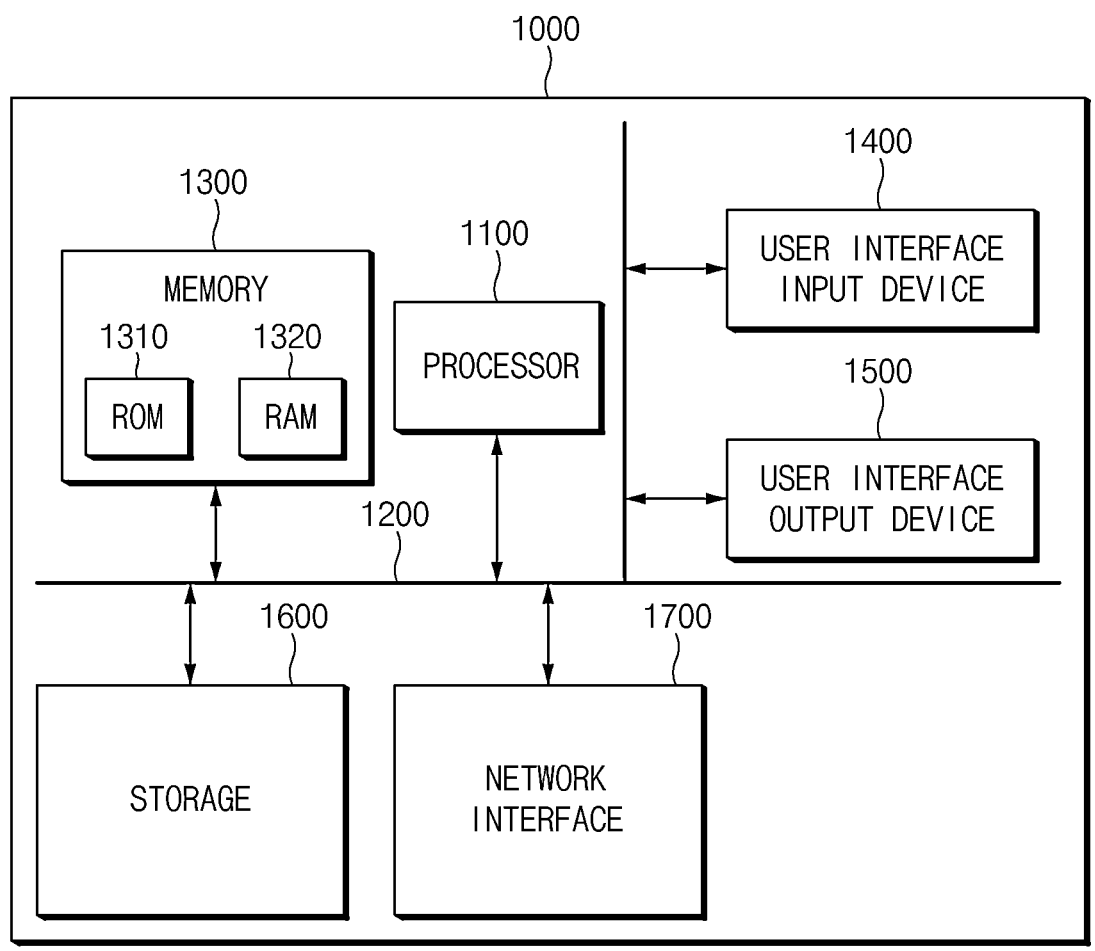

One or more embodiments of the present disclosure as described above may be performed based on a computing system shown in FIG. 13.

FIG. 13 illustrates a computing system.

Referring to FIG. 13, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The processor 1100 may include some functions of the processor 100 described above. Each of the memory 1300 and the storage 1600 may include various types of volatile or nonvolatile storage media. For example, the memory may include a read only memory (ROM) and a random access memory (RAM).

Thus, the operations of the methods or algorithms described in connection with the disclosure may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications and modifications may be made by one skilled in the art without departing from the essential characteristic of the present disclosure.

Accordingly, one or more embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

According to the autonomous driving control apparatus and a control method thereof according to the present disclosure, while collisions between vehicles are prevented, traffic congestion may be reduced by adjusting an excessive deceleration limit level.

According to the autonomous driving control apparatus and a control method thereof according to the present disclosure, traffic flow may be smoothly maintained by adjusting the excessive deceleration limit level in response to diverse driving situations.

Besides, a variety of effects directly or indirectly understood through the specification may be provided.

Hereinabove, although the present disclosure has been described with reference to one or more example embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous driving control apparatus comprising:
   a sensor device configured to detect a leading vehicle of a host vehicle;
   a communication device configured to receive, from the leading vehicle, vehicle information of the leading vehicle; and
   one or more processors; and
   memory storing instructions that, when executed by the one or more processors, cause the autonomous driving control apparatus to:
   based on a deceleration request of the host vehicle, operate in an excessive deceleration limit mode; and
   determine, based on the vehicle information of the leading vehicle, a speed control signal for changing a vehicle speed of the leading vehicle; and
   adjust, based on the speed control signal and while operating in the excessive deceleration limit mode, an excessive deceleration limit level of the host vehicle.

2. The autonomous driving control apparatus of claim 1, wherein the instructions, when executed by the one or more processors, cause the autonomous driving control apparatus to operate in the excessive deceleration limit mode further based on a requested acceleration of the host vehicle being less than a threshold acceleration value.

3. The autonomous driving control apparatus of claim 1, wherein the speed control signal comprises a brake-pedal position sensor (BPS) signal of the leading vehicle, and
   wherein the instructions, when executed by the one or more processors, cause the autonomous driving control apparatus to adjust the excessive deceleration limit level by decreasing the excessive deceleration limit level based on a change amount of the BPS signal of the leading vehicle within a unit time duration being greater than or equal to a threshold value.

4. The autonomous driving control apparatus of claim 1, wherein the speed control signal comprises an accelerator position sensor (APS) signal of the leading vehicle, and
   wherein the instructions, when executed by the one or more processors, cause the autonomous driving control apparatus to adjust the excessive deceleration limit level by increasing the excessive deceleration limit level based on a change amount of the APS signal of the leading vehicle within a unit time duration being greater than or equal to a threshold value.

5. The autonomous driving control apparatus of claim 1, wherein the instructions, when executed by the one or more processors, cause the autonomous driving control apparatus to determine the speed control signal based on a requested acceleration profile of the leading vehicle and based on the leading vehicle being in an autonomous driving mode.

6. The autonomous driving control apparatus of claim 1, wherein the instructions, when executed by the one or more processors, cause the autonomous driving control apparatus to adjust the excessive deceleration limit level by:
   increasing the excessive deceleration limit level based on a time-to-collision (TTC) value between the host vehicle and the leading vehicle being greater than or equal to a threshold time value.

7. The autonomous driving control apparatus of claim 1, wherein the instructions, when executed by the one or more processors, cause the autonomous driving control apparatus to adjust the excessive deceleration limit level by:
   increasing the excessive deceleration limit level based on a braking delay of the host vehicle being less than a threshold time value.

8. The autonomous driving control apparatus of claim 1, wherein the instructions, when executed by the one or more processors, cause the autonomous driving control apparatus to adjust the excessive deceleration limit level by:
   increasing the excessive deceleration limit level based on an acceleration of the leading vehicle exceeding a threshold acceleration value.

9. The autonomous driving control apparatus of claim 1, wherein the instructions, when executed by the one or more processors, cause the autonomous driving control apparatus to adjust the excessive deceleration limit level by:
   increasing the excessive deceleration limit level based on a communication delay of the host vehicle being less than a threshold time value.

10. The autonomous driving control apparatus of claim 1, wherein the instructions, when executed by the one or more processors, further cause the autonomous driving control apparatus to:
    perform artificial intelligence learning on at least one of: a time-to-collision (TTC) with respect to the leading vehicle, an acceleration of the leading vehicle, a braking delay of the host vehicle, a communication delay of the host vehicle, the speed control signal of the leading vehicle, or an acceleration profile of the leading vehicle.

11. An autonomous driving control method comprising:
    operating, by a computing device, a host vehicle in an excessive deceleration limit mode based on a deceleration request of the host vehicle;
    receiving, from a leading vehicle, vehicle information of the leading vehicle, the vehicle information comprising an indication of a speed control signal for changing a vehicle speed of the leading vehicle; and
    adjusting, based on the speed control signal and while operating in the excessive deceleration limit mode, an excessive deceleration limit level of the host vehicle.

12. The method of claim 11, wherein the operating of the host vehicle in the excessive deceleration limit mode is further based on a requested acceleration of the host vehicle being less than a threshold acceleration value.

13. The method of claim 11, wherein the adjusting of the excessive deceleration limit level comprises:
    decreasing the excessive deceleration limit level based on a change amount of a brake-pedal position sensor (BPS) signal of the leading vehicle within a unit time duration is greater than or equal to a threshold value.

14. The method of claim 11, wherein the speed control signal comprises an accelerator position sensor (APS) signal of the leading vehicle, and
    wherein the adjusting of the excessive deceleration limit level comprises:
    increasing the excessive deceleration limit level based on a change amount of the APS signal of the leading vehicle within a unit time duration being greater than or equal to a threshold value.

15. The method of claim 11, further comprises:
    determining the speed control signal based on a requested acceleration profile of the leading vehicle and based on the leading vehicle being in an autonomous driving mode.

16. The method of claim 11, wherein the adjusting of the excessive deceleration limit level comprises:
    increasing the excessive deceleration limit level based on a time-to-collision (TTC) value between the host vehicle and the leading vehicle being greater than or equal to a threshold time value.

17. The method of claim 11, wherein the adjusting of the excessive deceleration limit level comprises:
increasing the excessive deceleration limit level based on a braking delay of the host vehicle being less than a threshold time value.

18. The method of claim 11, wherein the adjusting of the excessive deceleration limit level comprises:
increasing the excessive deceleration limit level based on an acceleration of the leading vehicle exceeding a threshold acceleration value.

19. The method of claim 11, wherein the adjusting of the excessive deceleration limit level comprises:
increasing the excessive deceleration limit level based on a communication delay of the host vehicle being less than a threshold time value.

20. The method of claim 11, wherein the adjusting of the excessive deceleration limit level comprises:
perform artificial intelligence learning on at least one of: a time-to-collision (TTC) with respect to the leading vehicle, an acceleration of the leading vehicle, a braking delay of the host vehicle, a communication delay of the host vehicle, the speed control signal of the leading vehicle, or an acceleration profile of the leading vehicle.

* * * * *